United States Patent
Matsumoto et al.

(10) Patent No.: US 7,663,360 B2
(45) Date of Patent: Feb. 16, 2010

(54) ROTATION ANGLE DETECTING DEVICE

(75) Inventors: Kouichirou Matsumoto, Kariya (JP);
Takashi Kawashima, Nagoya (JP);
Osamu Shimomura, Okazaki (JP)

(73) Assignees: DENSO CORPORATION, Kariya (JP);
Nippon Soken, Inc., Nishio (JP)

( * ) Notice: Subject to any disclaimer, the term of this patent is extended or adjusted under 35 U.S.C. 154(b) by 0 days.

(21) Appl. No.: 11/878,523

(22) Filed: Jul. 25, 2007

(65) Prior Publication Data

US 2008/0048651 A1   Feb. 28, 2008

(30) Foreign Application Priority Data

Aug. 24, 2006   (JP)   ............... 2006-227680

(51) Int. Cl.
*G01R 33/02* (2006.01)
*G01R 33/06* (2006.01)

(52) U.S. Cl. ............... 324/207.25; 324/207.2

(58) Field of Classification Search ............ 324/207.25, 324/207.12, 207.21, 252, 207.2, 207.23, 324/207.26

See application file for complete search history.

(56) References Cited

U.S. PATENT DOCUMENTS

| | | | | |
|---|---|---|---|---|
| 4,791,366 A | * | 12/1988 | Suzuki et al. | 324/207.25 |
| 5,644,226 A | * | 7/1997 | Aoyama et al. | 324/207.21 |
| 6,326,781 B1 | * | 12/2001 | Kunde et al. | 324/207.21 |
| 2006/0028203 A1 | | 2/2006 | Kawashima et al. | |
| 2006/0170419 A1 | | 8/2006 | Shimomura et al. | |
| 2007/0069719 A1 | | 3/2007 | Hatanaka | |

FOREIGN PATENT DOCUMENTS

JP   2003-75108   3/2003

* cited by examiner

*Primary Examiner*—Reena Aurora
(74) *Attorney, Agent, or Firm*—Nixon & Vanderhye, P.C.

(57) ABSTRACT

A rotation angle detecting device includes a magnetic member for providing a magnetic field, a magnetic sensor for sensing a change in the magnetic field when the magnetic member rotates relative to the magnetic sensor about a rotation axis. The magnetic sensor is disposed at a single position and includes a pair of sensor elements. The pair of sensor elements is disposed on an imaginary plane that is perpendicular to the rotation axis so that sensing surfaces of the sensor elements have 90 degrees in angle to each other and so that each of the sensing surfaces inclines by 45 degrees in angle to a line intersecting the rotation axis at right angles.

13 Claims, 9 Drawing Sheets

UNDERLINE: PRIOR ART

ROTATION ANGLE DETECTING DEVICE

CROSS REFERENCE TO RELATED APPLICATION

The present application is based on and claims priority from Japanese Patent Application 2006-227680, filed Aug. 24, 2006, the contents of which are incorporated herein by reference.

BACKGROUND OF THE INVENTION

1. Field of the Invention

The present invention relates to a rotation angle detecting device for detecting a rotation angle of a rotating object such as a crank shaft of an engine or a wheel of a vehicle.

2. Description of the Related Art

JP-2003-75108-A discloses a rotation angle detecting device. In such a rotation angle detecting device, a change in magnetic field caused by rotation of a permanent magnet rotor is detected by a pair of magnetic sensor elements for providing a pair of output signals. The output signals are converted into trigonometric functions to calculate the rotation angle of the rotating object.

Such a rotation angle detecting device has a difficulty in reducing its size because the pair of sensor elements is disposed distant from each other along the circumference of a permanent magnet rotor.

Further, it is difficult to accurately position the sensor elements around the permanent magnet rotor because of vibration when the rotation angle detecting device is installed into a motor vehicle or the like. As shown in FIG. 18, the magnetic flux density distribution around a permanent magnet rotor 400 is not uniform. Accordingly, one of the sensor elements may sense a change in the magnetic flux density that is different from the other sensor element if the sensor elements are not accurately positioned. Further, because such a sensor element changes its output signal as the temperature surrounding the sensor changes, the magnetic sensor may provide an inaccurate output signal if the temperature surrounding one of the sensor elements is different from the temperature surrounding the other sensor element.

If a pair of magnetic sensor elements 412, 412' is integrated into a unit 410 that is disposed at a position around the permanent magnet rotor 400 as shown in FIG. 16, the size of the rotation angle detecting device can be reduced. In this case, the first sensor elements 412 is disposed so that the first sensor surface 413 thereof can be perpendicular to a line intersecting the rotation axis 404 of the permanent magnet rotor 400 at right angles and the second sensor element 412' is disposed so that the second sensor surface 413' thereof can be perpendicular to the first sensor surface 413.

However, the sensor elements 412, 412' provide output signals whose amplitude are different from each other as shown in FIG. 17 when the permanent magnet rotor 400 rotates, because the sensor elements 412, 412' are respectively disposed in the magnetic field of different magnetic flux density. Therefore, it is difficult to accurately convert the output signals to trigonometric functions.

SUMMARY OF THE INVENTION

Therefore, an object of the invention is to provide a compact and accurate rotation angle detecting device.

According to a feature of the invention, a rotation angle detecting device includes a magnetic member for providing a magnetic field, a magnetic sensor for sensing a change in the magnetic field when the magnetic member rotates relative to the magnetic sensor about a rotation axis, in which: the magnetic sensor is disposed at a single position and includes a pair of sensor elements; the pair of sensor elements is disposed on an imaginary plane that is perpendicular to the rotation axis so that sensing surfaces of the sensor elements have 90 degrees in angle to each other; and each of the sensing surfaces inclines by 45 degrees in angle to a line intersecting the rotation axis at right angles.

Therefore, a compact rotation angle detecting device can be provided. Further, temperature difference between the pair of sensor elements can be minimized.

Even if the magnetic sensor is shifted from the permanent magnet rotor, the output signals of the pair of sensor elements equally change, so that the rotation angle can be detected accurately.

Assuming that maximum magnetic flux densities sensed by a magnetic sensor 410 that includes a pair of magnetic sensor elements 412, 412' shown in FIG. 16 are A and B, the magnetic flux densities $B_0 x$, $B_0 y$ that are detected when a permanent magnet rotor 400 rotates by an angle $\theta$ relative to the magnetic sensor 410 are expressed as follows:

$$B_0 x = A \times \sin\theta \quad (1)$$

$$B_0 y = A \times \cos\theta \quad (2)$$

On the other hand, as shown in FIGS. 1A and 1B for example, the pair of sensor elements (e.g. 22, 22') is disposed on an IC chip (e.g. 20) that is placed on an imaginary plane perpendicular to the rotation axis (e.g. 200) of the permanent magnet rotor (e.g. 12) so that their sensing surfaces (e.g. 23, 23') are disposed to have an angle of 90 degrees between each other and so that each of the sensing surfaces inclines by 45 degrees in angle to a line (e.g. 202) intersecting the rotation axis (e.g. 200) of the permanent magnet rotor at right angles.

The magnetic flux densities $B_1 x$, $B_1 y$ that are sensed by a pair of magnetic sensor elements according to the present invention are expressed as follows:

$$B_1 x = B_0 x \times \cos 45° + B_0 y \times \sin 45° \quad (3)$$

$$B_1 y = -B_0 x \times \sin 45° + B_0 y \times \cos 45° \quad (4)$$

From the expressions (1)-(4), $B_1 x, B_1 y$ are expressed as follows:

$$B_1 x = B_0 x / (2^{1/2}) + B_0 y / (2^{1/2}) \quad (5)$$
$$= A \times \sin\theta / (2^{1/2}) - B \times \cos\theta / (2^{1/2})$$
$$= ((A^2 + B^2)/2)^{1/2} \times \sin(\theta + \beta)$$

$$B_1 y = -B_0 x / (2^{1/2}) + B_0 y / (2^{1/2}) \quad (6)$$
$$= -A \times \sin\theta / (2^{1/2}) - B \times \cos\theta / (2^{1/2})$$
$$= ((A^2 + B^2)/2)^{1/2} \times \sin(\theta + \gamma)$$

It can be understood from the expressions (5) and (6) that even if the maximum values A, B of the output signals of the pair of magnetic sensor elements 412, 412' of the magnetic sensor 410 shown in FIG. 16 are different from each other, the maximum values of the output signals of the pair of magnetic sensor elements 22, 22' of the magnetic sensor 20 according to the present invention are the same to each other (i.e. $(A^2 + B^2)/2)^{1/2}$). That is, the amplitudes of the output signals of the pair of sensor elements 22, 22' are equal to each other.

According to another feature of the invention, the permanent magnet rotor is formed of a disk-shaped or cylindrical member.

According to another feature of the invention, a pair of magnetic sensor elements is integrally formed on a single chip. Therefore, the angle between the sensor surfaces of the sensor elements can be accurately set to 90 degrees in angle.

From the expression (5), the following expressions can be provided:

$$\sin \beta = -B/(A^2+B^2)^{1/2} \quad (7)$$

$$\cos \beta = A/(A^2+B^2)^{1/2} \quad (8)$$

therefore, $$\beta = \cos^{-1}(A/(A^2+B^2)^{1/2}) \quad (9)$$

and from the expression (6), the following expression can be provided:

$$\sin \gamma = -B/(A^2+B^2)^{1/2} \quad (10)$$

$$\cos \gamma = -A/(A^2+B^2)^{1/2} \quad (11)$$

therefore, $$\gamma = \cos^{-1}(-A/(A^2+B^2)^{1/2}) = 180° - \beta \quad (12)$$

Thus, the phase difference ($\beta-\gamma$) between the output signals of the pair of magnetic sensor elements can be expressed as follows:

$$(\beta-\gamma) = (180°-\beta) = 2\times(\beta-90°) \quad (13)$$

As understood from the expression (13), the difference in phase between the output signals of two magnetic sensor elements is not equal to 90°. It is also understood from the expressions (9) and (12) that the phase difference ($\beta-\gamma$) in the structure shown in FIG. 16 varies as the maximum values A, B change.

In the prior art structure shown in FIG. 16, the maximum values A, B of the magnetic flux densities that are detected by the pair of magnetic sensor elements 412, 412' change if the position of the magnetic sensor 410 is shifted in a radial direction.

On the other hand, in the structure according to the invention, the maximum value of the magnetic flux density that is detected by each of the pair of magnetic sensor elements 22, 22' does not change even if the position of the magnetic sensor is shifted in a radial direction.

According to another feature of the invention, each of the sensor elements is a Hall element.

According to another feature of the invention, the rotation angle detecting device further includes means for calculating a rotation angle of the rotating object by converting the output signals of the sensor elements to trigonometric functions. The means for calculating a rotation angle may adjust the phase difference between the output signals to 90 degrees in angle.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Some preferred embodiments according to the present invention will be described with reference to the appended drawings.

A rotation angle detecting device 10 according to the first embodiment of the invention will be described with reference to FIGS. 1-8.

Figure 18:
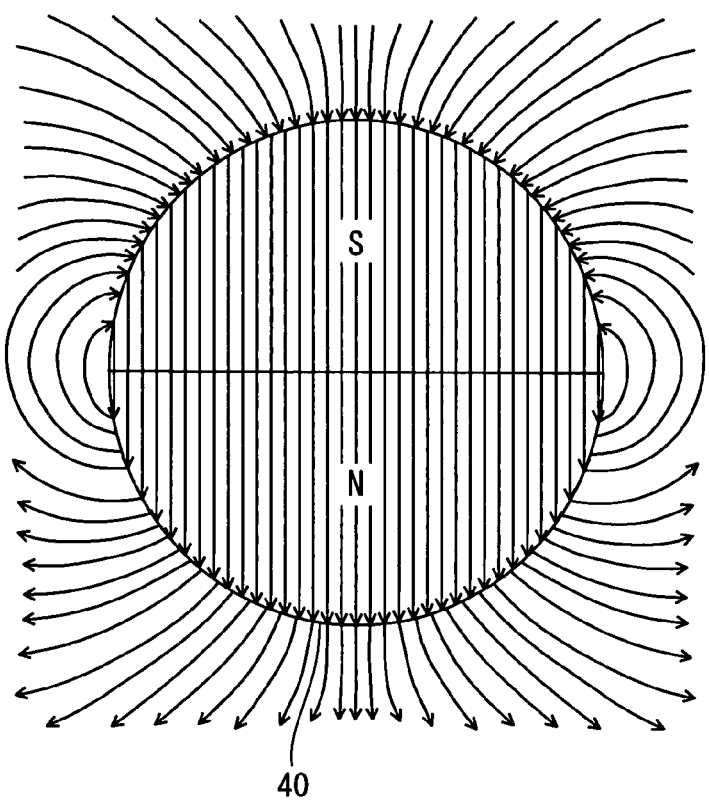
FIG. 18 is a schematic diagram illustrating magnetic fields formed inside and around a magnetic rotor.

The rotation angle detecting device 10 is connected to a rotating object, such as an engine crank shaft or a steering wheel of a vehicle in order to detect the rotation angle of the crankshaft or the steering wheel. The rotation angle detecting device 10 includes a disk-shaped permanent magnet rotor 12, a magnetic sensor (hereinafter referred to as the Hall IC) 20, and an electronic control unit (hereinafter referred to as ECU) 30. The permanent magnet rotor 12 is constructed of a pair of semicircular permanent magnets and a rotary shaft 14 that rotates about its rotation axis 200. The permanent magnet rotor 12 is magnetized in a radial direction, as shown in FIG. 18.

The Hall IC 20 is disposed at a place around the circumference of the permanent magnet rotor 12. The Hall IC 20 includes a pair of Hall elements 22, 22' and the ECU 30 so as to provide the ECU with the output signals of the Hall elements 22, 22'. The ECU 30 may be separated form the Hall IC, however.

Figure 1A:
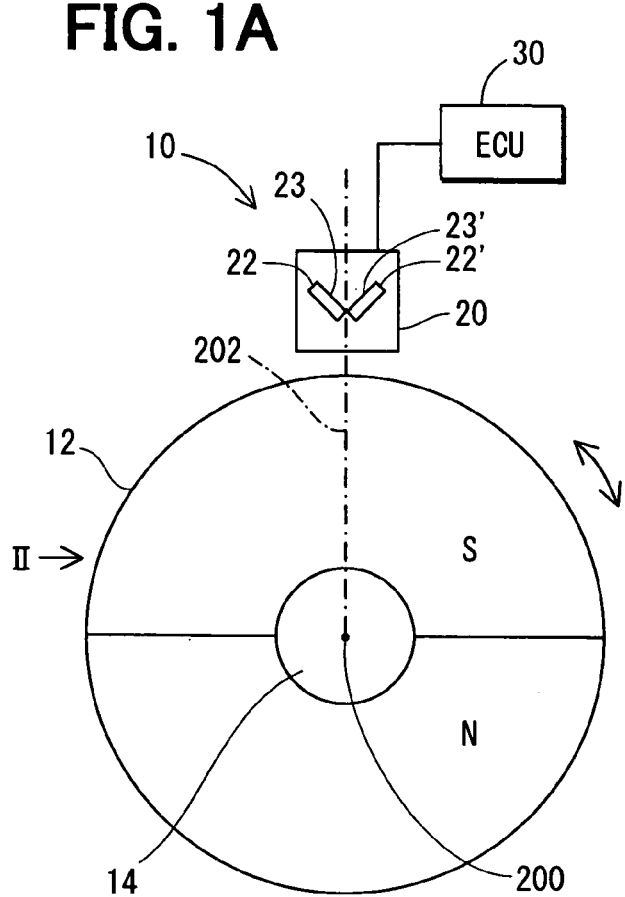
FIG. 1A is a plan view of a rotation angle detecting device according to the first embodiment of the invention.
Figure 1B:
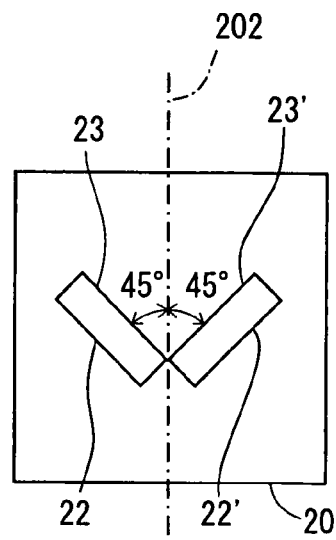
FIG. 1B is an enlarged view of a magnetic sensor of the rotation angle detecting device shown in FIG. 1A.
Figure 2:
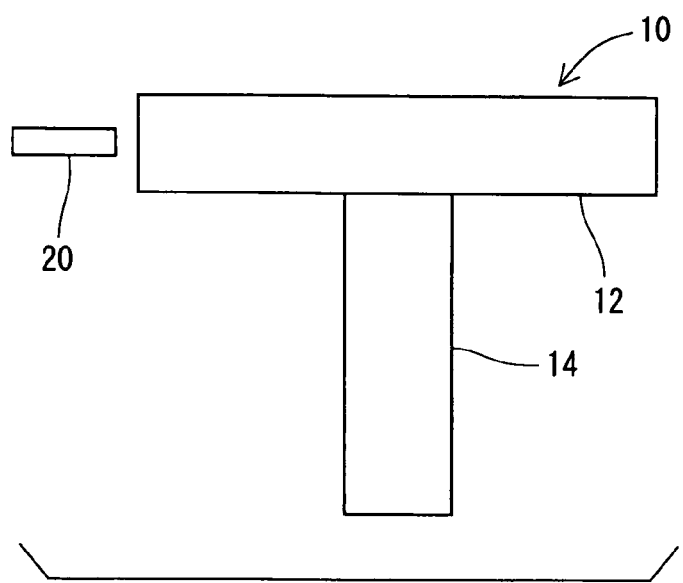
FIG. 2 is a side view of the rotation angle detecting device viewed from portion II in FIG. 1A.
Figure 3:
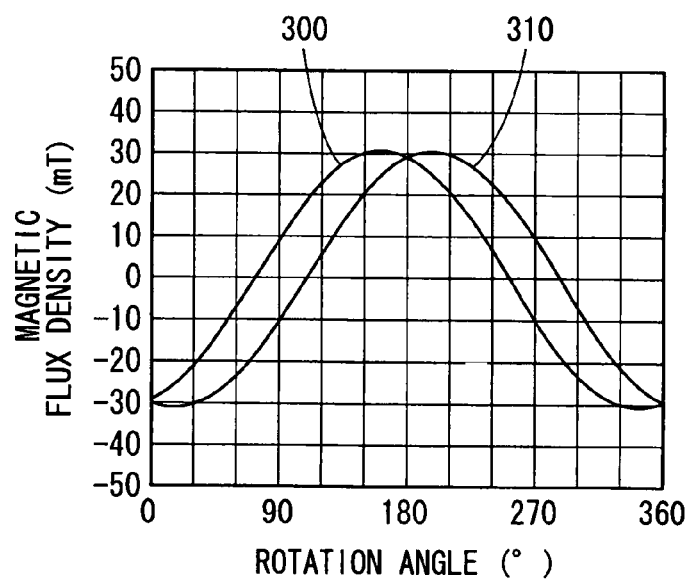
FIG. 3 is a graph showing a pair of output signal curves of a pair of magnetic sensor elements of the rotation angle detecting device according to the first embodiment of the invention when a permanent magnet rotor of the same makes full rotation.

Each of the Hall elements 22, 22' has a magnetic sensor surface 23, 23' and is arranged to be placed on an imaginary plane that is perpendicular to the rotation axis 200 so that the magnetic sensor surface 23 inclines by 45 degrees in angle toward a normal line 202 that intersects the rotation axis 200 of the permanent magnet rotor 12 at right angles, as shown in FIGS. 1A, 1B, and so that the magnetic sensor surfaces 23 of the pair of magnetic sensor elements 22 are positioned to have 90 degrees in angle between them. Therefore, the Hall elements 23 are disposed symmetric with respect to the normal line 202.

The ECU 30 includes a CPU, a ROM, an EEPROM, etc. so that the ECU 30 can calculate a rotation angle of a rotating object from the output signals of the Hall IC 20 using a rotation angle calculation program that is stored in the EEPROM or the ROM.

A rotation angle of a rotating object is calculated from the output signals of the Hall elements in one of the following ways.

(Calculation 1)

If the permanent magnet rotor 12 rotates relative to the Hall elements 22, 22' of the Hall IC 20 by a rotation angle θ, magnetic flux densities $B_1x$, $B_1y$ that are detected by the pair of Hall elements 22, 22' are expressed from the expression (5), (6) and (12) as follows:

$$B_1x = V \times \sin(\theta + \beta) \tag{20}$$

wherein: V is a maximum value of the magnetic density detected by the magnetic sensor elements, or equal to $((A^2+B^2)/2)^{1/2}$.

$$\begin{aligned} B_1y &= V \times \sin(\theta + \gamma) \\ &= V \times \sin(\theta + (180° - \beta)) \\ &= -V \times \sin(\theta - \beta) \end{aligned} \tag{21}$$

-continued
$$\begin{aligned} B_1x + B_1y &= V \times \sin(\theta + \beta) - V \times \sin(\theta - \beta) \\ &= 2V \times \cos\theta \sin\beta \end{aligned} \tag{22}$$

$$\begin{aligned} B_1x - B_1y &= V \times \sin(\theta + \beta) + V \times \sin(\theta - \beta) \\ &= 2V \times \sin\theta \cos\beta \end{aligned} \tag{23}$$

Then, the following expression is provided from the expressions (22) and (23):

$$\begin{aligned} (B_1x + B_1y)/(B_1x - B_1y) &= \sin\theta \cos\beta / \cos\theta \sin\beta \\ &= \tan\theta \cot\beta \end{aligned}$$

Figure 4:
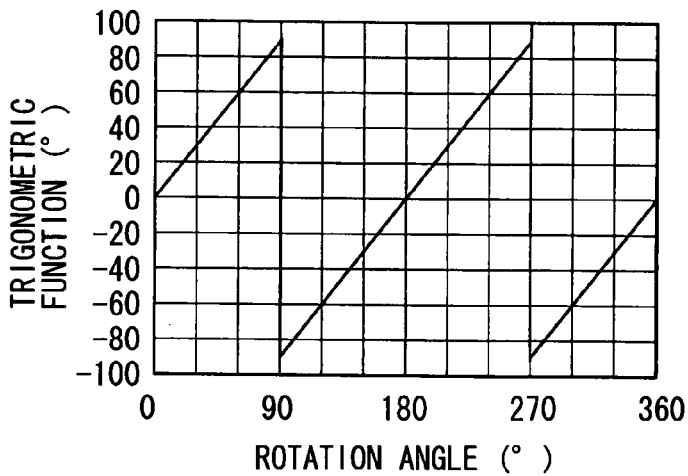
FIG. 4 is a graph showing a relation between the rotation angle and trigonometric angles.

Therefore, $$\theta = \tan^{-1}(\tan\beta \times (B_1x+B_1y)/(B_1x-B_1y)) \tag{24}$$

which is shown in FIG. 4.

(Calculation 2)

If the maximum flux densities A and B are measured beforehand, the rotation angle θ can be expressed as follows:

$$\theta = -\tan^{-1}(-(B/A) \times (B_1x-B_1y)/(B_1x+B_1y)) \tag{30}$$

(Calculation 3)

Since $\tan\beta = \cot(90°-\beta)$, the expression (24) can be expressed as follows:

$$\theta = \tan^{-1}(\cot(90-\beta) \times (B_1x+B_1y)/(B_1x-B_1y)) \tag{40}$$

Assuming that the phase difference between the output signals of the pair of magnetic sensor elements 22 is α, then $\alpha = \beta - \gamma = -(180°-2\beta)$.

Therefore, $$-\alpha/2 = 90° - \beta \tag{41}$$

The following expression is provided from the expressions (40) and (41):

$$\begin{aligned} \theta &= \tan^{-1}(\cot(-\alpha/2) \times (B_1x - B_1y)/(B_1x + B_1y)) \\ &= -\tan^{-1}(\cot(\alpha/2) \times (B_1x - B_1y)/(B_1x + B_1y)) \end{aligned} \tag{42}$$

(Calculation 4)

Figure 5:
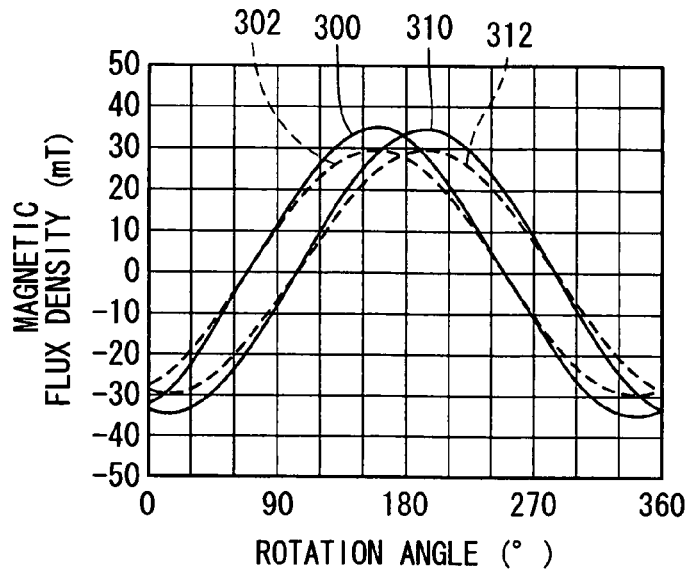
FIG. 5 is a graph showing output signal curves of the magnetic sensor elements when the permanent magnet rotor makes full rotation in case the magnetic sensor elements are shifted from a normal position.
Figure 6A:
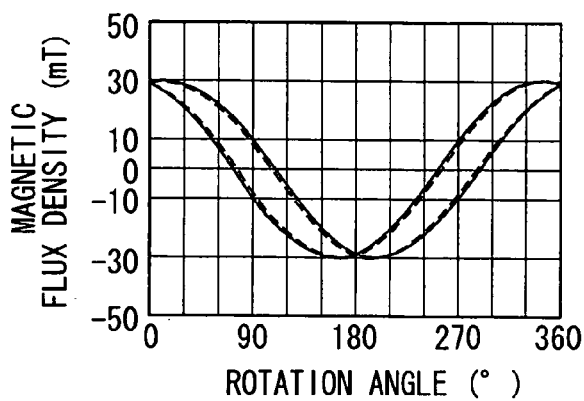
FIG. 6A is a graph showing output signal curves of the magnetic sensor elements when the permanent magnet rotor makes full rotation in case the magnetic sensor elements are shifted from a normal position.
Figure 6B:
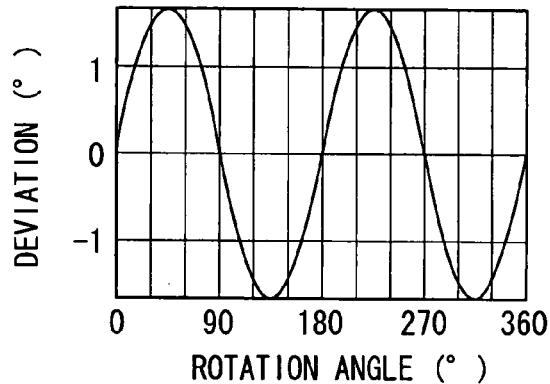
FIG. 6B is a graph showing deviations in rotation angle when the magnetic sensor elements are shifted from a normal position.
Figure 7A:
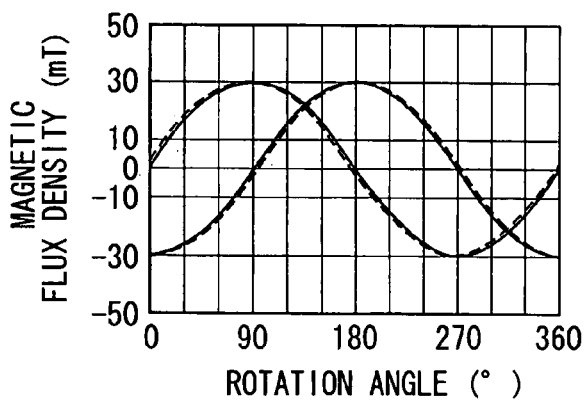
FIG. 7A is a graph showing output signal curves of the magnetic sensor elements after the phase difference is adjusted.
Figure 7B:
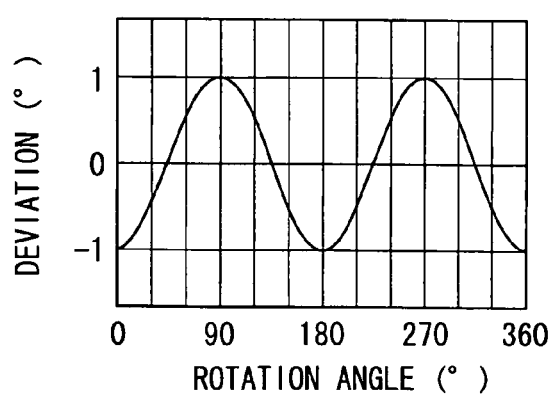
FIG. 7B is a graph showing deviations in rotation angle when the phase difference between the output signals of the pair of magnetic sensor elements are adjusted.
Figure 8:
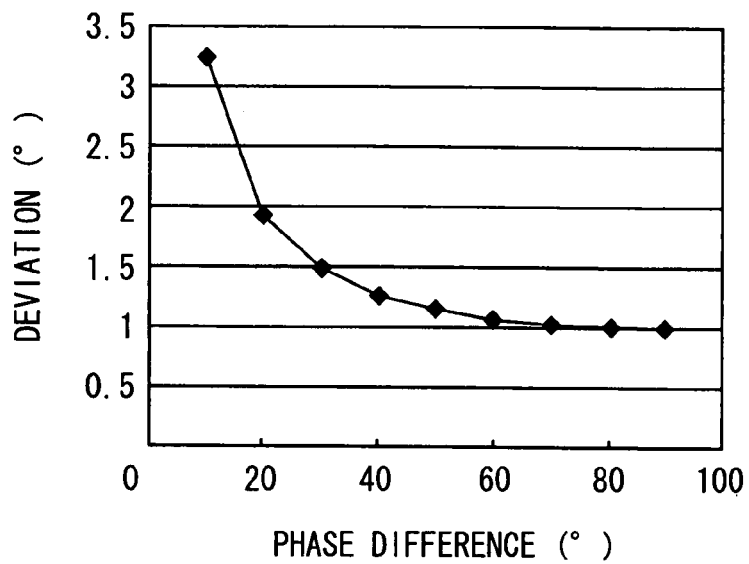
FIG. 8 is a graph showing a relation between the phase difference in the output signals and deviations in the rotation angle.

If the Hall IC 20 is shifted in a radial direction from the permanent magnet rotor 12, the phase of each of the output signals 300, 312 of the pair of Hall elements 22, 22' varies as shown in FIG. 5. If the phase difference between two output signals increases to near 90 degrees in angle, the deviation of the rotation angle becomes smaller as shown in FIG. 8. In case that the phase difference is much smaller than 90 degrees in angle, the deviation of the rotation angle varies as shown in FIG. 6B. On the other hand, the deviation of the rotation angle is smaller than the former case, as shown in FIG. 7B, in case that the phase difference is 90 degrees in angle. Incidentally, broken lines in FIGS. 6A and 7A show the output signals of the Hall elements 22 when the Hall IC 20 is shifted.

In this case, the phase difference between the output signals of the Hall elements 22 is adjusted to 90 degrees in angle by using a map.

Thus, the rotation angle can be calculated by one of the above ways of calculation.

(Temperature Characteristic Correction)

Temperature characteristics of the sensor elements are taken into account, the rotation angle can be calculated as follows.

Figure 16:
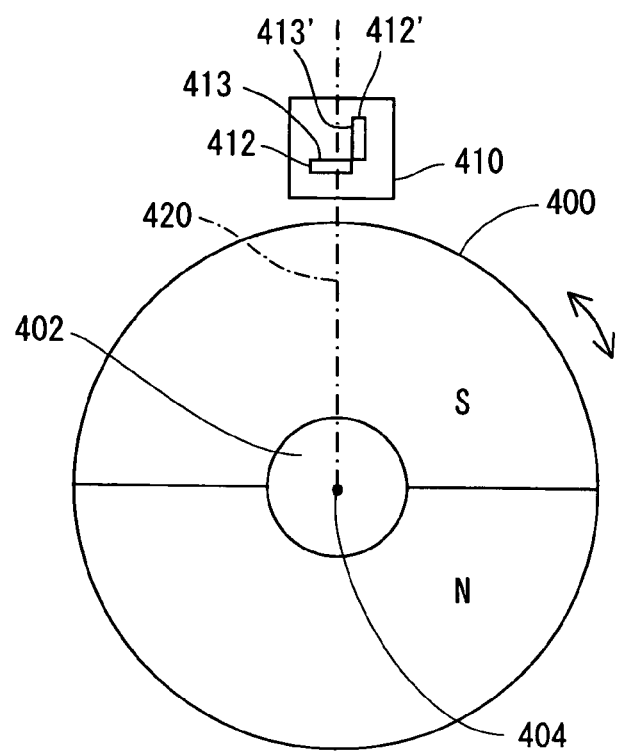
FIG. 16 is a plan view of a rotation angle detecting device of a prior art.
Figure 17:
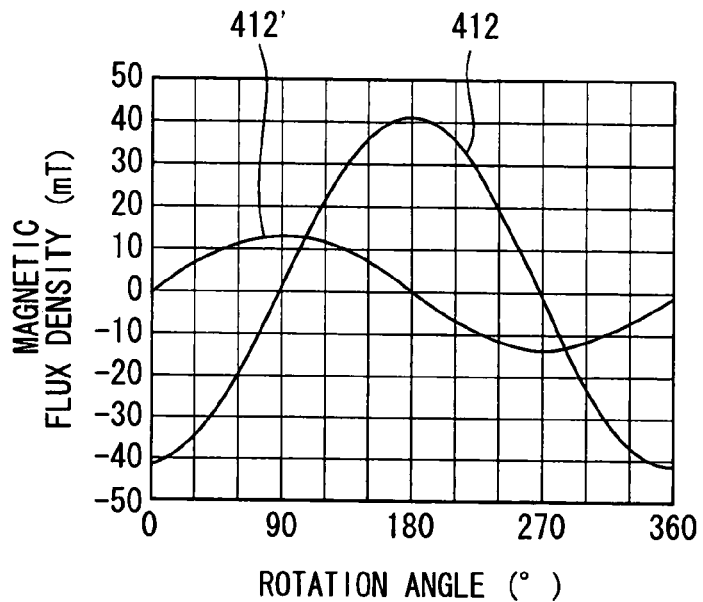
FIG. 17 is a graph showing a pair of output signal curves of a magnetic sensor of the rotation angle detecting device of a conceptive structure when a permanent magnet rotor of the same makes full rotation.

Assuming that: (i) the magnetic flux densities detected by the magnetic sensor elements 412, 412' shown in FIG. 16 are $B_2x$, $B_2y$; (ii) the magnetic flux densities detected by the magnetic sensor elements 22, 22' shown in FIG. 1 are $B_3x$, $B_3y$; (iii) the phase angle of the magnetic sensor elements are $\beta$, $\gamma$; and (iv) the temperature characteristic coefficient of the magnetic sensor elements is k (t), the following expression can be formed from expression (1), (2), (5) and (6):

$$B_2x = k(t) \times B_0x = A \times k(t) \times \sin\theta \quad (50)$$

$$B_2y = k(t) \times B_0y = -B \times k(t) \times \cos\theta \quad (51)$$

$$B_3x = B_2x/(2^{1/2}) + B_2y/(2^{1/2}) \quad (52)$$
$$= A \times k(t) \times \sin\theta/(2^{1/2}) - B \times k(t) \times \cos\theta/(2^{1/2})$$
$$= k(t) \times (A^2 + B^2)/2)^{1/2} \times \sin(\theta + \beta_3)$$

$$B_3y = B_2x/(2^{1/2}) + B_2y/(2^{1/2}) \quad (53)$$
$$= A \times k(t) \times \sin\theta/(2^{1/2}) - B \times k(t) \times \cos\theta/(2^{1/2})$$
$$= k(t) \times (A^2 + B^2)/2)^{1/2} \times \sin(\theta + \gamma_3)$$

Then, the following expression is formed from the expression (52):

$$\cos\beta_3 = A/(A^2 + B^2)^{1/2}$$

Therefore, the following expression can be formed from the expressions (8) and (9):

$$\beta_3 = \cos^{-1}(A/(A^2+B^2)^{1/2}) = \beta \quad (54)$$

The following expression can be formed from the expression (53):

$$\cos\gamma_3 = A/(A^2+B^2)^{1/2}$$

Further, the following expression is formed from expressions (11) and (12):

$$\gamma_3 = \cos^{-1}\left(-A/(A^2+B^2)^{1/2}\right) = \gamma = 180 - \beta \quad (55)$$

It is understood from the expressions (52)-(55) that the phase angles of the output signals of the magnetic sensor elements 22, 22' will not change although the amplitude of the output signals are multiplied by k (t). That is, the phase difference between the magnetic sensor elements 22, 22' will not change.

The following expression can be formed from the expressions (5), (6) and (52)-(55):

$$B_3x = k(t) \times (A^2+B^2)/2)^{1/2} \times \sin(\theta + \beta_3) = k(t) \times B_1x \quad (56)$$

$$B_3y = k(t) \times (A^2+B^2)/2)^{1/2} \times \sin(\theta + \gamma_3) = k(t) \times B_1y \quad (57)$$

If $B_1x$ and $B_1y$ in the expression (24) are respectively changed to $B_3x$ and $B_3y$ and the expressions (56) and (57) are substituted therefor, the rotation angle $\theta$ is expressed as follows:

$$\theta = \tan^{-1}(\tan\beta \times (B_3x - B_3y)/(B_3x + B_3y)) \quad (58)$$
$$= \tan^{-1}(\tan\beta \times k(t) \times (B_1x - B_3y)/(k(t) \times (B_1x + B_1y)))$$
$$= \tan^{-1}(\tan\beta \times (B_1x - B_3y)/(B_1x + B_1y))$$

Thus, even if the temperature surrounding the magnetic sensor elements change, the rotation angle $\theta$ will not change.

Figure 9A:
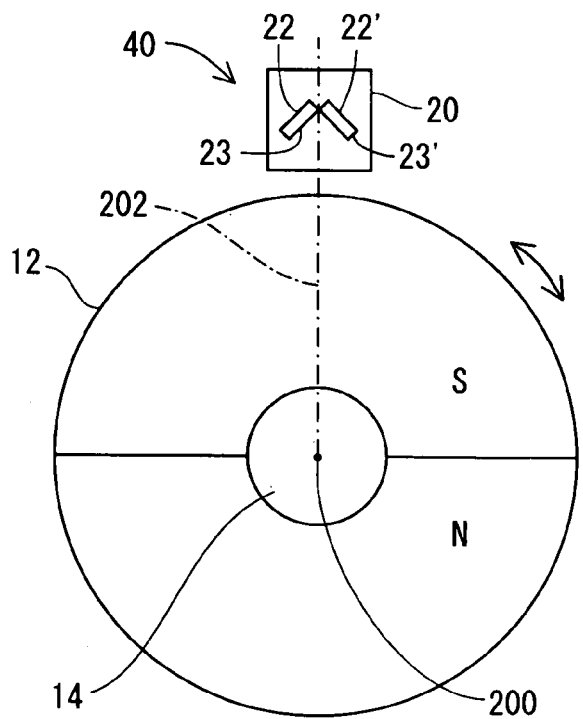
FIG. 9A is a plan view of a rotation angle detecting device according to the second embodiment of the invention.
Figure 9B:
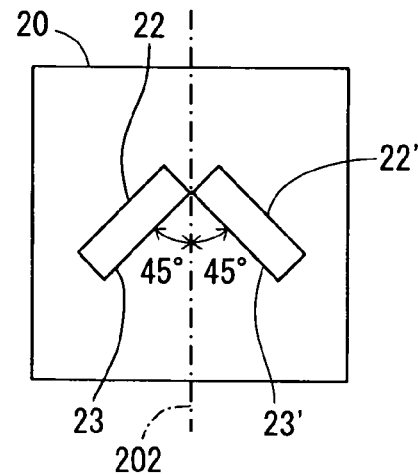
FIG. 9B is an enlarged view of a pair of magnetic sensor elements of the rotation angle detecting device shown in FIG. 9A.

A rotation angle detecting device according to the second embodiment of the invention is shown in FIGS. 9A and 9B.

The rotation angle detecting device 40 includes a pair of Hall elements 22, 22'. Each of the Hall elements 22, 22' has a magnetic sensor surface 23 or 23' and is arranged to be on an imaginary plane that is perpendicular to the rotation axis 200 of the permanent magnet rotor 12 so that each of the magnetic sensor surfaces 23, 23' inclines by 45 degrees in angle toward a normal line 202 that intersects the rotation axis 200 at right angles and so that the magnetic sensor surfaces 23 of the pair of magnetic sensor elements 22 are positioned to have 90 degrees in angle between them. Therefore, the Hall elements 23 are disposed symmetric with respect to the line 202.

However, the sensor surfaces 23, 23' are arranged to face the permanent magnet rotor 12, which is opposite to the sensor surfaces of the first embodiment.

A rotation angle detecting device according to the third embodiments of the invention will be described with reference to FIGS. 10A, 10B.

Figure 10A:
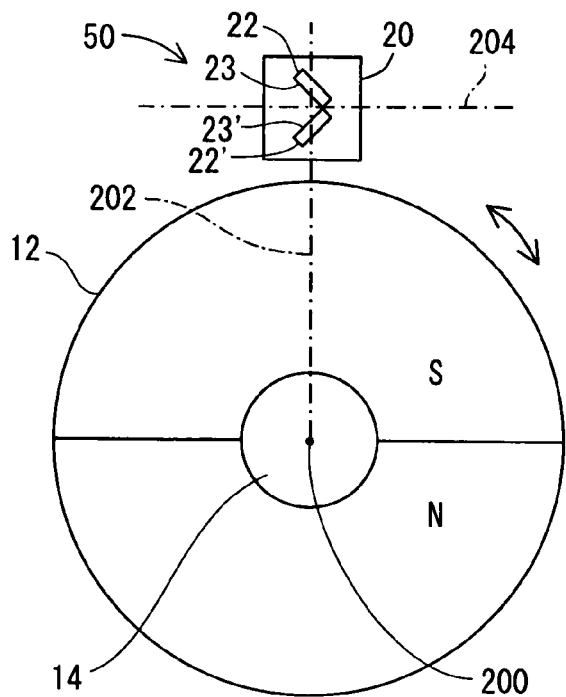
FIG. 10A is a plan view of a rotation angle detecting device according to the third embodiment of the invention.
Figure 10B:
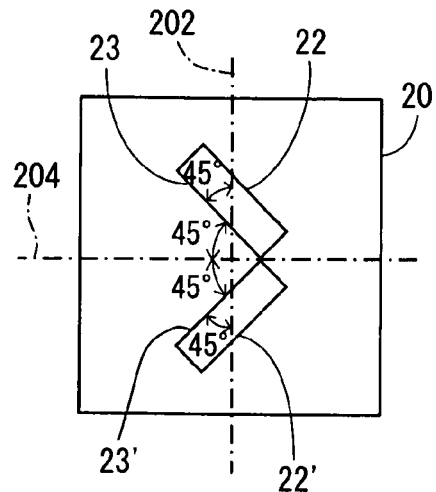
FIG. 10B is an enlarged view of a pair of magnetic sensor elements of the rotation angle detecting device shown in FIG. 10A.

As shown in FIGS. 10A and 10B, the rotation angle detecting device 50 includes a pair of Hall elements 22, 22'. Each of the Hall elements 22, 22' has a magnetic sensor surface 23 or 23' and is arranged to be disposed on an imaginary plane that is perpendicular to the rotation axis 200 of the permanent magnet rotor 12 so that each of the magnetic sensor surfaces 23, 23' inclines by 45 degrees in angle toward a line 202 that intersects the rotation axis 200 at right angles and so that the magnetic sensor surfaces 23, 23' of the pair of magnetic sensor elements 22, 22' are positioned to have 90 degrees in angle between them. However, the Hall elements 23, 23' are disposed not symmetric with respect to the line 202 but disposed symmetric with respect to a line 204 that extends in parallel with a tangential line of the outer circumference of the permanent rotor 12 that intersects the line 202 at right angles.

Figure 11A:
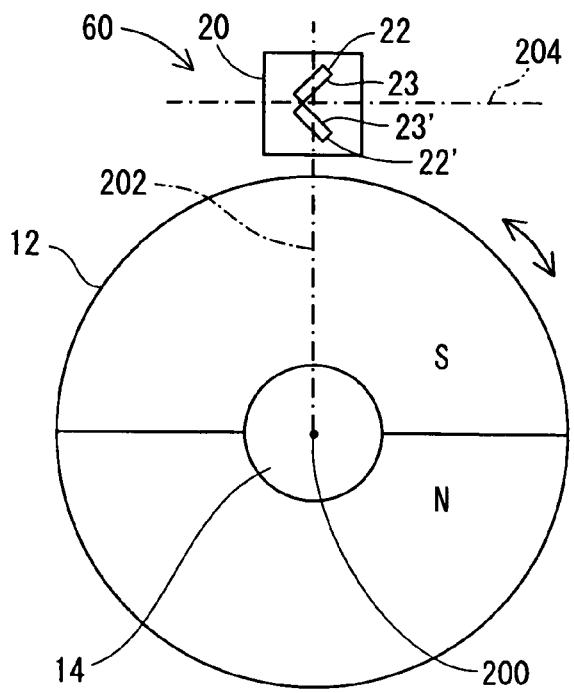
FIG. 11A is a plan view of a rotation angle detecting device according to the fourth embodiment of the invention.
Figure 11B:
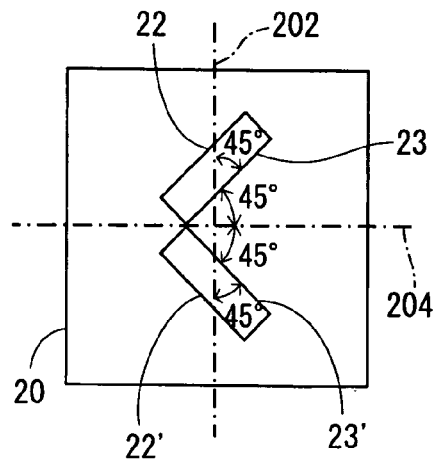
FIG. 11B is an enlarged view of a pair of magnetic sensor elements of the rotation angle detecting device shown in FIG. 11A.

A rotation angle detecting device 60 according to the fourth embodiment of the invention is shown in FIGS. 11A and 11B.

Each of the Hall elements 22, 22' is disposed in the same manner as the fourth embodiment except that the sensor surfaces 23, 23' are arranged to face in the opposite direction.

Figure 12A:
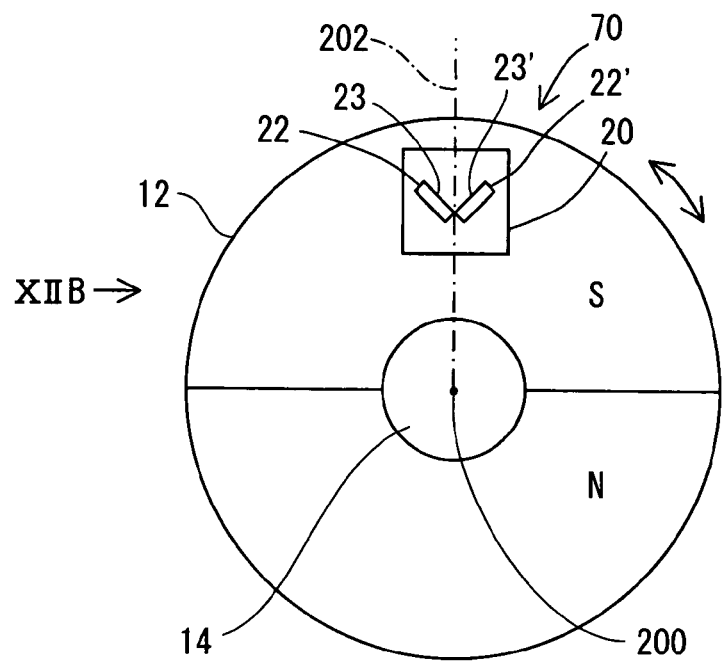
FIG. 12A is a plan view of a rotation angle detecting device according to the fifth embodiment of the invention.
Figure 12B:
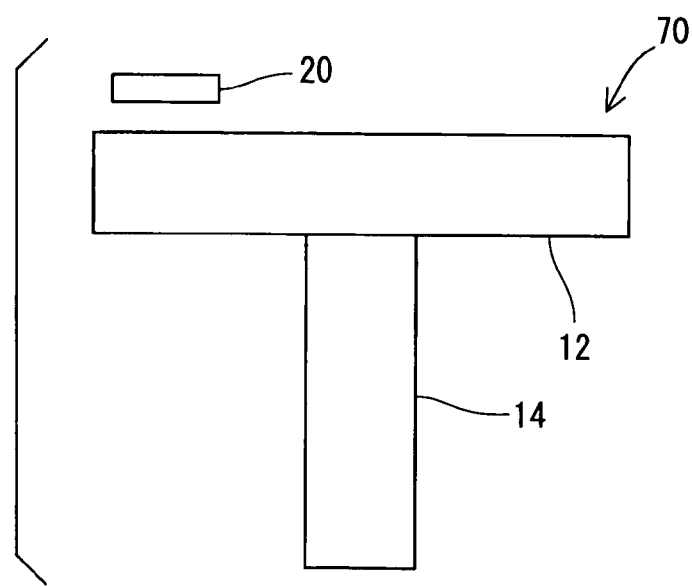
FIG. 12B is a side view of the rotation angle detecting device viewed from portion B in FIG. 12A.

A rotation angle detecting device according to the fifth embodiment of the invention will be described with reference to FIGS. 12A and 12B.

The rotation angle detecting device 70 includes a pair of Hall elements 22, 22'. Each of the Hall elements 22, 22' has a magnetic sensor surface 23 or 23' and is arranged to be disposed on an imaginary plane that is perpendicular to the rotation axis 200 of the permanent magnet rotor 12 so that each of the magnetic sensor surfaces 23, 23' inclines by 45 degrees in angle toward the normal line 202 that intersects the rotation axis 200 at right angles and so that the magnetic sensor surfaces 23, 23' of the pair of magnetic sensor elements 22, 22' are positioned to have 90 degrees in angle between them. Therefore, the Hall elements 23, 23' are disposed symmetric with respect to the line 202. However, the Hall IC 20 is not disposed at a position around the permanent magnet rotor 12 but is disposed at a position above and within the circumference of the permanent magnet rotor 12.

Figure 13:
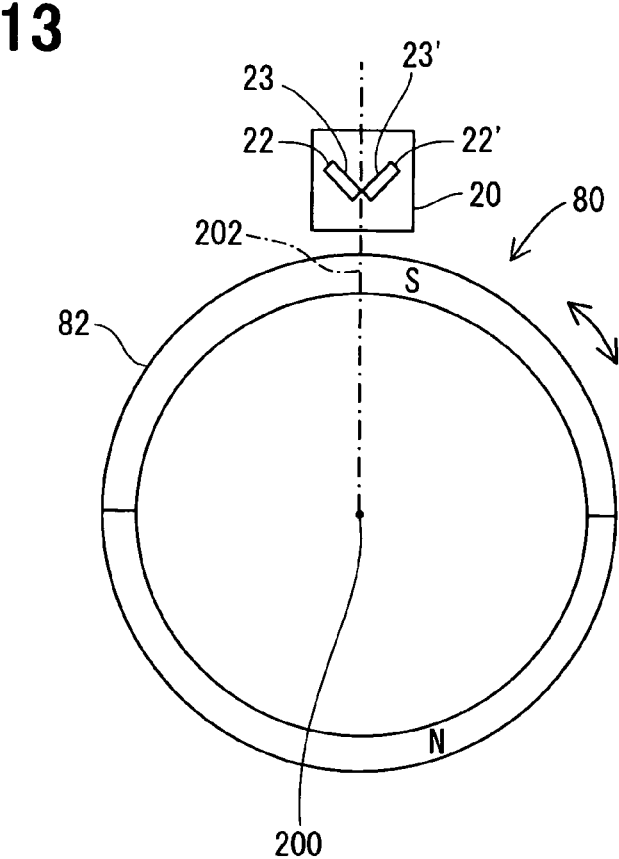
FIG. 13 is a plan view of a rotation angle detecting device according to the sixth embodiment of the invention.

A rotation angle detecting device according to the sixth embodiment of the invention will be described with reference to FIG. 13.

The rotation angle detecting device 80 includes a pair of Hall elements 22, 22' and a ring-shaped permanent magnet rotor 82, which is different from the disk-shaped permanent magnet rotor 12 in that the magnet rotor 82 is constructed of a pair of arc-shaped permanent magnets. Each of the Hall elements 22, 22' has a magnetic sensor surface 23 or 23' and is arranged to be disposed on an imaginary plane that is perpendicular to the rotation axis 200 of the permanent magnet rotor 82 so that each of the magnetic sensor surfaces 23, 23' inclines by 45 degrees in angle toward the normal line 202 that intersects the rotation axis 200 at right angles and so that the magnetic sensor surfaces 23, 23' of the pair of magnetic sensor elements 22, 22' are positioned to have 90 degrees in angle between them. Therefore, the Hall elements 23, 23' are disposed symmetric with respect to the line 202.

Figure 14:
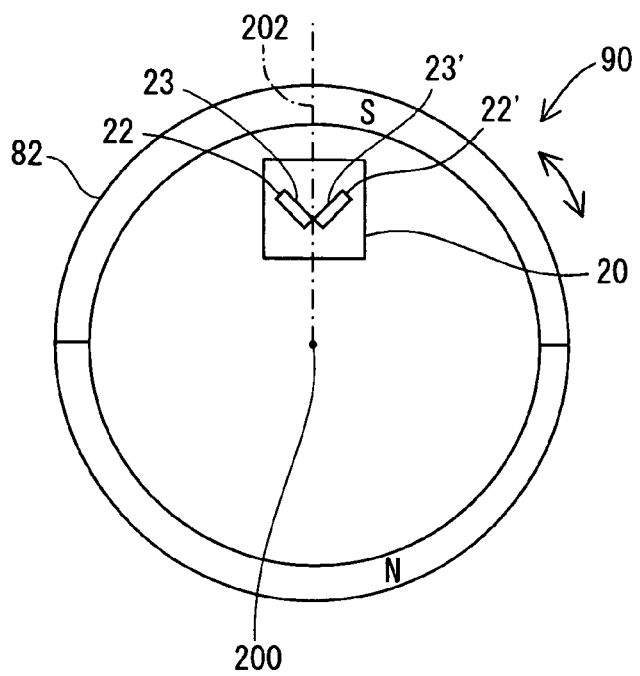
FIG. 14 is a plan view of a rotation angle detecting device according to the seventh embodiment of the invention.
Figure 15:
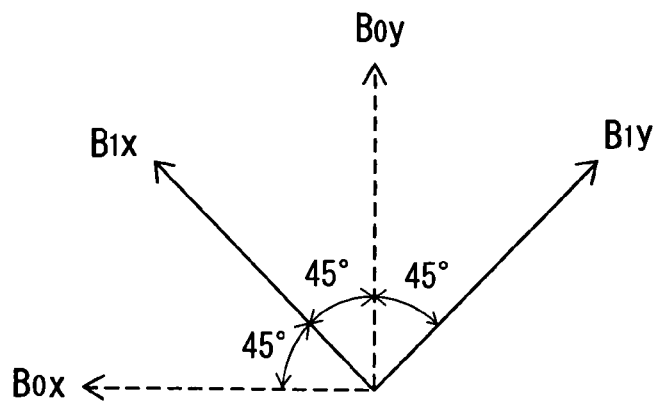
FIG. 15 is a graph showing a difference in detecting direction of the magnetic flux between the magnetic sensor of a prior art and that according to the embodiments of the present invention.

A rotation angle detecting device according to the seventh embodiment of the invention will be described with reference to FIG. 14.

The rotation angle detecting device 90 has the same structure as the sixth embodiment except that the Hall IC 20 is disposed at a position above and within the circumference of the permanent magnet rotor 82.

The Hall elements 22, 22' can be formed separately. The ring-shaped permanent magnets 82 may be constructed of a pair of short bar-like permanent magnets and a pair of arc-shaped members that support the permanent magnets instead of the pair of arc-shaped permanent magnets.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotation angle detecting device comprising:
   a magnetic member for providing a magnetic field that rotates with a rotating object;
   a magnetic sensor for sensing a change in the magnetic field when the magnetic member rotates relative to the magnetic sensor about a rotation axis; and
   means for calculating a rotation angle of the rotating object by converting the output signals of the magnetic sensor to trigonometric functions, wherein:
   the magnetic member comprises a disk-shaped permanent magnet magnetized in a radial direction to provide a pair of diametrically opposite N and S poles on its outer periphery to form the magnetic field; and
   the magnetic sensor comprises a pair of sensor elements disposed adjacent to each other on a single plate that is disposed at a place adjacent a circumference of the permanent magnet so as to be perpendicular to the rotation axis, so that said sensor elements are closer to the circumference of the permanent magnet than to the rotation axis, and so that sensing surfaces of the sensor elements are disposed at an angle of 90 degrees to each other; and so that each of the sensing surfaces is inclined by 45 degrees in angle to a line intersecting the rotation axis at a right angle.

2. A rotation angle detecting device as in claim 1, wherein the permanent magnet is a disk-shaped member.

3. A rotation angle detecting device as in claim 1, wherein the permanent magnet is a ring-shaped member.

4. A rotation angle detecting device as in claim 1, wherein each of the sensor elements is a Hall element.

5. A rotation angle detecting device as in claim 1, wherein the pair of sensor elements is integrally formed on an IC chip.

6. A rotation angle detecting device as in claim 1, wherein the means for calculating a rotation angle adjusts the phase difference between the output signals to 90 degrees in angle.

7. A rotation angle detecting device as in claim 1, wherein the means for calculating a rotation angle calculates the rotation angle based on both of the output signals and the phase angle of one of the output signals.

8. A rotation angle detecting device as in claim 1, wherein the means for calculating a rotation angle calculates the rotation angle based on both of the output signals and a phase difference between the output signals.

9. A rotation angle detecting device as in claim 1, assuming that: a first maximum value of the output signal of first one of the sensor elements that is disposed on the single plate so that the sensing surface thereof is parallel to the line intersecting the rotation axis is A; and a second maximum value of the output signal of the second one of the sensor elements that is disposed on the single plate so that the sensing surface thereof is perpendicular to the sensing surface of the first one of sensor elements is B, the means for calculating a rotation angle calculates the rotation angle based on A, B and both of the output signals thereof.

10. A rotation angle detecting device as in claim 1, wherein said single plate is disposed adjacent the circumference of the permanent magnet so that the magnetic sensor is in a same plane as the disk-shaped permanent magnet.

11. A rotation angle detecting device comprising:
    a disk-shaped two-pole permanent magnet connected with a rotating object disposed to be rotatable about a rotation axis to provide a rotating magnetic field, wherein the permanent magnet is magnetized in a radial direction to provide a pair of diametrically opposite N and S poles on its outer periphery to form the magnetic field; and
    a pair of magnetic sensor elements having sensing surfaces disposed adjacent to each other to form an L-shape on a single plate that is disposed at a place adjacent a circumference of the permanent magnet and so as to be perpendicular to the rotation axis, so that the sensor elements are closer to the circumference of the permanent magnet than to the rotation axis, wherein:
    each of the sensing surfaces is inclined by 45 degrees in angle to a line intersecting the rotation axis at a right angle.

12. A rotation angle detecting device as in claim 11, wherein the permanent magnet is magnetized in a radial direction to provide a pair of diametrically opposite N and S poles on its outer periphery to form the magnetic field.

13. A rotation angle detecting device as in claim 11, wherein said single plate is disposed adjacent the circumference of the permanent magnet so that the magnetic sensor is in a same plane as the disk-shaped permanent magnet.

* * * * *